United States Patent Office 3,289,258
Patented Dec. 6, 1966

3,289,258
COUPLING HOOK
Erik Helmer Eriksson, Ornskoldsvik, Sweden, assignor to Mo Och Domsjo Aktiebolag, Ornskoldsvik, Sweden, a limited company of Sweden
Filed Sept. 18, 1964, Ser. No. 397,503
Claims priority, application Sweden, Sept. 23, 1963, 10,383/63
13 Claims. (Cl. 24—123)

This invention relates to a coupling hook for use in loading and conveying devices where a plurality of load units are connected together to a common main load cable, and, more particularly, to a coupling hook comprising a pair of matched coupling members for engagement of a load cable without danger of jamming or accidentally opening while attached thereto, and provided with means for attaching and locking the coupling cable thereto.

Coupling hooks are widely used in the forestry and woodworking industries for transporting elongated articles, such as planks and timber, which are joined together and then coupled to a load cable for transport by tractor or other transporter. The planks and timber generally are bundled together by a coupling cable, which is then attached to the load cable by the coupling hook.

It is desirable that such coupling hooks run freely along the load cable without danger of opening by themselves or of jamming on the cable. The coupling hook should also be capable of supporting heavy loads. The running hooks previously available for these purposes are provided with running sheaths which have the disadvantage that the sheaths can be distorted, and that the running hooks can become entangled with other hooks on the same cable, disconnecting them from the cable. Consequently, it is not possible in such cases to have the hooks running in close proximity with each other along the load cable.

In accordance with the invention, a coupling hook is provided that runs freely on the cable with a minimum of friction, and without distortion, and without danger of entanglement with other coupling hooks on the same cable, while at the same time accidental disengagement of the hooks from the cable is absolutely prevented. Nonetheless, the hooks is easily removed form the cable when this be desired, and while so doing, the coupling cable is locked in place.

The coupling hook in accordance with the invention comprises, in combination, a pair of matched coupling members, each formed with an end having a slotted opening for sliding engagement of a load cable, and pivotally mounted at the other end in opposed facing realtionship, so that the ends when in juxtaposition define a closed guide opening for the load cable, and when pivoted away from each other permit passage of the load cable through the slots thereof, for coupling and uncoupling to the load cable. Each coupling member in addition has a second guide opening, preferably positioned between the first-mentioned end and the pivotally mounted end for reception of and attachment to a coupling cable so positioned as to bend the coupling cable sufficiently to lock it therein when the hook ends are pivoted a predetermined distance away from each other.

In a preferred embodiment, the coupling hook in accordance with the invention comprises two substantially identical coupling members, each having a hook-shaped end, but mounted so that the hook-shaped ends face in opposite directions. Both coupling members are mounted at their bases on a common mounting shaft extending normal to the direction of travel of the load cable. The coupling members, when in juxtaposition, define at their hook-shaped ends a substantially circular running opening having lateral engagement faces for sliding engagement of the load cable. Each coupling member has a recess formed in the base for reception of the coupling cable, the open end of the recess being closed off either by the shaft common to the coupling members, or by a portion of the opposed coupling member, or by both, and being so shaped that when the coupling members are pivoted away from each other on the shaft, the coupling cable passing therethrough is locked in position by being bent around the means closing off the recess.

The drawings show a preferred embodiment of the coupling hook of the invention.

Like figures are used in the drawings to refer to like parts.

Figure 1:
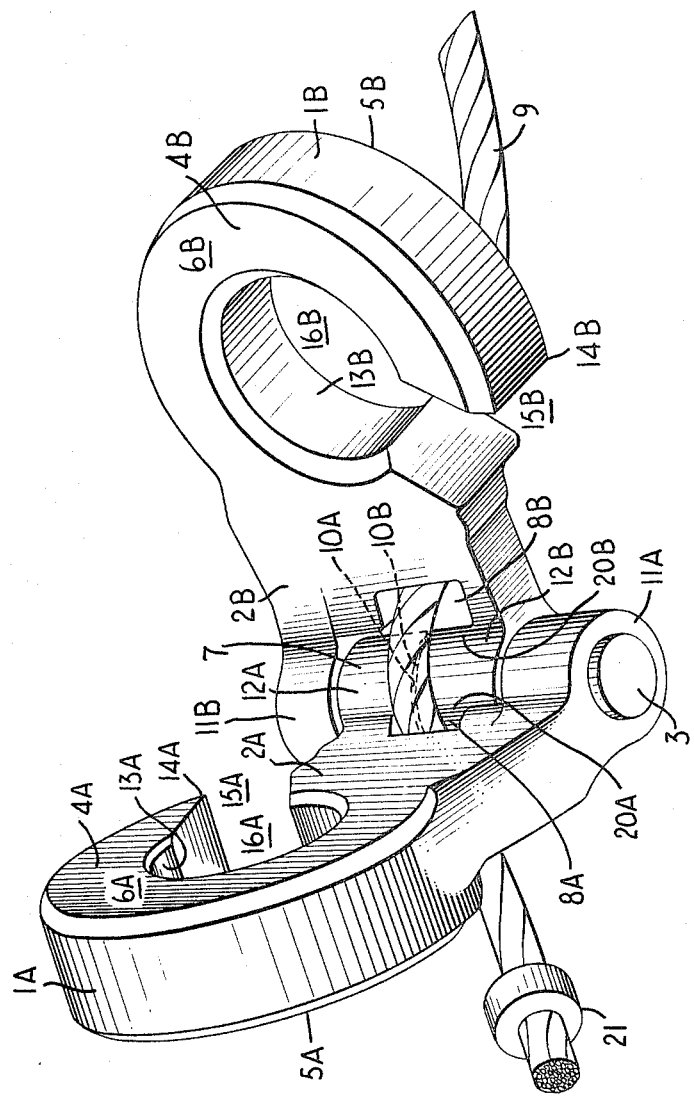
FIGURE 1 is a perspective view of the coupling hook, shown in the open position, for attachment to a load cable.
Figure 2:
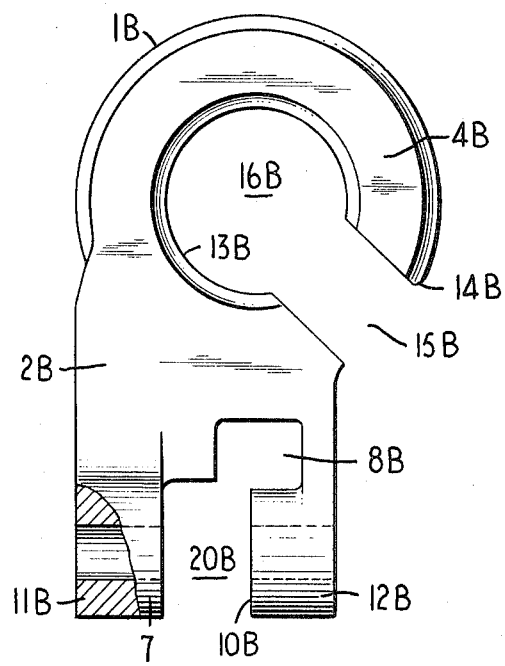
FIGURE 2 is an elevational view of a single coupling member of the coupling hook 1B of FIGURE 1.
Figures 3, 4:
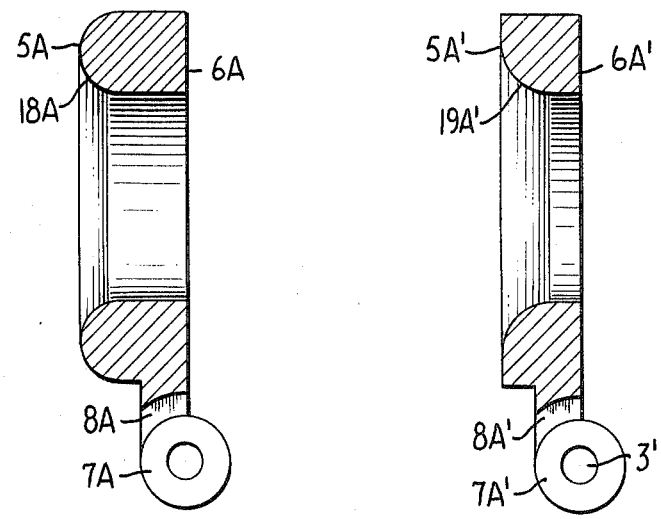
FIGURE 3 is a longitudinal section of the coupling member 1A of FIGURE 1.
FIGURE 4 is a longitudinal section of another embodiment of the coupling member in accordance with the invention.

The coupling hook of FIGURES 1 to 3, inclusive, comprises two substantially identical coupling members or halves, 1A, 1B, each formed with base portions 2A, 2B respectively, terminating in a pair of "eye" lugs 11A, 12A, 11B, 12B, respectively. These lugs are shaped to receive a common shaft or axle 3, on which the coupling members 1A, 1B are pivotally mounted. The shaft 3 is fitted in one of the central lugs 12B or 12A in a press fit, and the remaining lugs fit loosely thereover for easy pivoting. Retaining end nuts can also be used, if desired, suitably extending and threading the ends of shaft 3 to receive them.

Each of coupling members 1A, 1B is formed with a hook-shaped end 4A, 4B, respectively, defining cable guide openings 16A, 16B, having an internal bearing or guide surface 13A, 13B for free running of the load cable therethrough. The hook-shaped ends terminate at 14A, 14B, respectively, defining with the base 2A, 2B, an opening 15A, 15B, sufficiently large to permit passage of the load cable therethrough, to insert the cable in or remove the cable from the running guide openings 16A, 16B.

The outer lateral engagement surfaces 5A, 5B and the inner lateral engagement surfaces 6A, 6B of each half are substantially flat. Thus the inner lateral surfaces provide good engagement with the corresponding surface of the other coupling members, and the outer lateral surfaces provide good engagement between adjacent coupling hooks on the same load cable. It will be appreciated that the lateral faces 5 and 6 can also be curved, or a combination of flat and curved surfaces, as may be desired, but that it is preferable that these be shaped similarly, so that the lateral surfaces of adjacent coupling hooks will match and that the abutting inner surfaces of the coupling members will also match. In the preferred embodiment, the surfaces are flat, as shown, and extend in a plane normal to the longitudinal direction of the load cable, and, moreover, the inner and outer lateral faces 5 and 6 are substantially parallel.

The outer lateral faces, 5A, 5B are curved in the portion abutting the bearing surfaces 13A, 13B of the hook so as to facilitate running of the load cable through the bearing guide openings 16A, 16B. Another form of rounded surface at this portion is shown in FIGURE 4, at 19A[1].

It will be apparent from FIGURES 1 to 3 that the

"eye" lugs, 11A, 11B, 12A, 12B are of such a shape and are so positioned at the bases of the coupling members 1A, 1B, that the two coupling members can be made identical and the lugs fit interdigitatingly over the common shaft 3. The inner flat lateral engagement faces 10A, 10B of the lugs 11A, 11B should be in the plane through the center of the running ring, and normal to the lateral inner engagement faces 6A, 6B, respectively. The "eye" lugs can be of equal widths, or, and this is preferred, formed with the lugs positioned below the openings 16A, 16B (in this case, lugs 12A, 12B) somewhat wider than the other "eye" lugs. The shaft 3 serving as a pivotal mounting for the "eye" lugs is arranged with its longitudinal axis in the extension of the plane through the lateral engagement faces 6A, 6B.

The inner diameter of the running openings or running rings 16A, 16B is selected according to the diameter of the load cable, and preferably is not more than 2.5 times the diameter of the cable. The width of the openings 15A, 15B likewise depends upon the diameter of the cable, but since the cable need not slide in this opening, it is preferably made as small as possible, while still permitting introduction of the cable. Generally, a width of from 1.2 to 1.5 times the diameter of the load cable is sufficient for the openings 15A, 15B.

In the base of each coupling member 1A, 1B, is a recess, 8A, 8B, adapted to receive the coupling cable 9. Since the coupling cable need not be run through the opening, but is instead retained in the coupling hook therein, this recess can be rather closely dimensioned to conform to the size of the cable.

It will be noted that the recesses 8A, 8B are eccentrically shaped, the base portion of the recess being offset considerably, as compared to the upper portion, as is best seen in FIGURE 2.

The eccentric shaping permits closing off of the open ends 20A, 20B of the recess, by the lugs 12B, 12A, respectively, of the opposed coupling member as is best seen in FIGURE 1. The surface of these "eye" lugs accordingly serves as a bearing surface 7 for the coupling cable 9. It is apparent that by pivoting the coupling members on the shaft 3, the cable 9 is thereby pinned closely against the bearing surface 7 and the bases of recesses 8A, 8B, by the coupling members, and is thereby locked in position whenever the coupling members are pivoted through a sufficient pivot arc.

It is also apparent from FIGURE 1 that the recesses 8A, 8B, as well as the openings 16A, 16B, are so positioned, that when the coupling members 1A, 1B, are in opposed relationship, as shown, but with the lateral engagement faces 6A, 6B in juxtaposition, the openings adjoin to form a common opening 8 and 16 for reception of the coupling cable and the load cable, respectively. Since the coupling members 1A, 1B, are so placed that the opening 15A of the member 1A faces in one direction, and the opening 15B of the member 1B in the opposite direction, when the two members are in juxtaposition, these openings are in effect closed by the closed or base portion of the hook of the other coupling member. On the other hand, when the coupling members are separated, as shown in FIGURE 1, it is easy to insert or remove a load cable from the running ring 16A, 16B, simply by turning the coupling hook 90° and slipping the cable through the openings 15A, 15B. The coupling cable 9, on the other hand, is most easily inserted through the recesses 8A, 8B, when the coupling members are in closed position, on the load cable or off it, as desired, being held in position in the recess only when the coupling members are separated. As is conventional, the coupling cable 9 is attached to the hook in the recess by the holding member or end stop 21, which prevents the coupling cable from being withdrawn from the recess, due to the fact that it is of a larger diameter than the recess.

In use, a coupling cable 9 will normally be inserted through the recesses 8A, 8B, while the coupling members are together, and the end stop 21 then locked in position on the end of the cable. The coupling members will then be separated, and the hook slipped over a load cable by forcing the cable through the openings 15A, 15B, in sequence, or simultaneously. The coupling members are then brought together, in which position the coupling hook is completely stable. Any attempt of the coupling members to separate accidentally is resisted by the cable 9, which resists being bent about the bearing surface 7, and thus tends to hold the coupling members together. Furthermore, such movement is also resisted by the load cable, which also tends to be bent 90° by such pivotal movement of the coupling members. If the coupling hook is under load, as is normally the case in use, such opening is also resisted by the weight of the load. When the coupling cable carries a load, the end stop 21 of the coupling cable is forced toward one coupling member, which also results in the two coupling members being forced together.

When the coupling cable 9 is relieved of load, it still tends to be as straight as possible, and thus continues to act to force the coupling members together.

Since the lateral outside faces 5A, 5B and lateral internal faces 6A, 6B of the coupling members are essentially parallel, and provided with entirely or partially flat lateral engagement surfaces, the coupling hooks of this invention will tend to assemble in a row on the load cable in close proximity to each other, without bending of the cable. Thus, removal of the hooks after transportation is finished is considerably facilitated. The lower portion of the running ring adjacent the base affords a supporting surface for a load line that is twice as large as that of known devices. Furthermore, the shape of the coupling hooks is such that they do not tend to entangle adjacent hooks. Also, it is impossible for the load line to become wedged in between the two coupling members, because of their configuration.

The fact that the mounting shaft 3 extends normal to the longitudinal direction of the load cable, it is necessary first to force the coupling members apart, and then turn the hook or the cable 90°, before the hook can be removed from the load cable. This insures that the coupling hooks will not accidentally become loose or detached from the load cable. Since the two coupling halves are identically similar in shape, and merely arranged to be mounted in opposed position, only one shape of part is necessary, in duplicate, for the manufacture of the coupling hook. This is an obvious advantage, facilitating manufacture and the provision of spare parts, and reducing costs.

The coupling hooks of the invention can be made of any suitable material, sufficiently strong for the intended loads. Metal is normally preferable, such as steel, stainless steel, aluminum and iron. Plastics also can be used, such as polytetrafluoroethylene, polytrifluorochloroethylene, polypropylene, nylon and polystyrene.

It will be understood that the shape of the hook and of the opening defined therein is in no way critical. While circular or nearly circular running guide openings are obviously preferable, the openings can be elliptical or trough-shaped to favor certain preferable orientations of the loads with respect to the load cable. Obviously, any configuration of opening that permits the hook to run freely and not bind on the load cable can be employed.

Likewise, the opening defined in the hook-shaped end of the coupling member for coupling to and removal from the cable can be in any desired position, provided the openings in the two coupling members are not in the same position, so that the members when in juxtaposition close off each other's openings. Thus, the opening in one member can be at a lower position, as shown in the drawings, or at an upper position, or an intermediate side position. In such cases, the members can be identical, but placed right and left. One opening can even be at the top of the hook, but both cannot be at the top, and so in this case the coupling members cannot be identical.

Any type of attachment to the pivoting shaft can be used. "Eye" lugs are convenient, but hook lugs are also useful. One lug will suffice for each coupling member, but two lugs give greater stability. Three or more lugs may be preferable for certain types of loads. The shaft is not essential. One member can be fashioned with a single lug, and the other with a lug to fit over that lug, in a hinge type joint.

Other variations will be apparent to those skilled in this art.

The coupling hooks of the invention are particularly adapted for use in forestry and in the woodworking industries for transporting logs, trees and timber, where the articles to be transported are spread over large areas, and are carried by means of a coupling cable and a plurality of coupling hooks attached to a common load cable, in turn attaced to a traction device, such as a winch, crane or tractor. In such uses, a markedly increased capacity and reduced wear of cables and coupling hooks are achieved. Also, because of the simplicity and sureness of coupling, it is not necessary to use straps for the bundles of elongated articles coupled together using the coupling cable.

Having regard to the foregoing disclosure, the following is claimed as new and inventive:

1. A coupling hook for attachment of a load carried by a coupling cable to a load cable comprising, in combination, a pair of matched coupling members, each formed with a first end having a slotted opening for engagement of a load cable, and pivotally mounted in opposed facing relationship to pivot transversely of their respective planes at the other end by means of lugs which pivotally engage a common shaft therethrough, so that the first ends when in juxtaposition define through the slotted openings a closed guide opening for the cable, and when pivoted away from each other afford passage of the load cable through the slots thereof for coupling of the coupling hook thereto; each coupling member having an additional guide opening positioned adjacent to the pivotally mounted end between said slotted opening and said lugs for reception of and attachment to a coupling cable, and positioned to bend a coupling cable through a predetermined arc when the said members are pivoted away from each other.

2. A coupling hook in accordance with claim 1, wherein the additional guide openings are in the form of recesses with open ends, pivot lugs adjacent each open end, the open ends being closed off by a pivot lug of the opposed coupling member, the coupling cable being bent around such lugs when the coupling members are pivoted away from each other on the shaft.

3. A coupling hook in accordance with claim 1, wherein said lugs are pivotally mounted on a common shaft extending therethrough in a direction normal to the longitudinal axis of the slotted openings.

4. A coupling hook in accordance with claim 3, each coupling member has lugs interdigitatingly mounted on the common shaft.

5. A coupling hook in accordance with claim 4, wherein the lugs are of different widths, with the interior lugs being slightly wider than the other lugs.

6. A coupling hook in accordance with claim 1, wherein the slotted openings of the matched coupling members, together define a guide opening that is substantially circular.

7. A coupling hook in accordance with claim 1, wherein the coupling members have lateral surfaces that are substantially flat and in a plane normal to the longitudinal axis of the slotted openings.

8. A coupling hook in accordance with claim 7, wherein the coupling members have substantially parallel inner and outer lateral surfaces.

9. A coupling hook in accordance with claim 1, wherein the outer lateral faces of the slotted openings are curved.

10. A coupling hook in accordance with claim 1, wherein the diameter of the slotted openings does not exceed 2.5 times the diameter of the load cable.

11. A coupling hook for attachment of the load carried by a coupling cable to a load cable comprising, in combination, a pair of matched coupling members, each formed with a hook-shaped end having an internal opening for engagement of a load cable, and pivotally mounted in opposed facing relationship at the other end, by means of lugs which pivotally engage a common shaft therethrough, to pivot transversely of their respective planes, so that the hook-shaped ends when in juxtaposition define a closed guide opening for the load cable, and when pivoted away from each other, permit passage of the load cable over the ends of the hooks for coupling of the coupling hook thereto, each coupling member having an additional guide opening positioned adjacent the pivotally mounted end between said hook-shaped end and said lugs, for reception of and attachment to a coupling cable, and positioned to bend a coupling cable through a predetermined arc when the said members are away from each other.

12. A coupling hook in accordance with claim 11, wherein the coupling members are provided with lugs interdigitatingly pivotally engaging the common shaft, the shaft extending in a direction normal to the longitudinal axis of the closed guide opening for the load cable.

13. A coupling comprising, in combination, a load cable; a coupling cable; and a pair of matched coupling members, each formed with a slotted annular portion at one end, and pivotally mounted in an opposed facing relationship, such that the pivot axis lies substantially at the intersection of the planes defined by each coupling member, and, when in juxtaposition, said annular portions defining a closed guide opening through which the load cable is disposed, and when pivoted away from each other, the slots being adapted to afford passage of the load cable therethrough for insertion and removal of the load cable into and from the coupling hook; each coupling member also having in proximity to the pivot axis and between the pivot axis and the slotted portion an aperture through which the coupling cable is disposed such that the coupling cable normally retains the coupling members in juxtaposition, and when the coupling members are pivoted away from each other, the coupling cable is bent through a predetermined arc.

References Cited by the Examiner

UNITED STATES PATENTS

| 31,946 | 4/1861 | Beagle | 24—242 |
|---|---|---|---|
| 1,085,455 | 1/1914 | McCaul. | |
| 1,499,738 | 7/1924 | King. | |
| 1,561,337 | 11/1925 | Madigan | 24—242 |

FOREIGN PATENTS 1,100,552  9/1955  France.

BERNARD A. GELAK, *Primary Examiner.*